US012693181B2

(12) United States Patent
Finzi et al.

(10) Patent No.: US 12,693,181 B2
(45) Date of Patent: Jul. 28, 2026

(54) VEHICLE WHEEL WITH A MEASURING DEVICE AND A MONITORING DEVICE FOR VEHICLES

(71) Applicant: Maxion Wheels Holding GmbH, Königswinter (DE)

(72) Inventors: Andrea Maria Davide Finzi, Triuggio (IT); Sunil Kumar Mandem, Maastricht (NL); Ralf Duning, Solingen (DE)

(73) Assignee: Maxion Wheels Holding GmbH, Königswinter (DE)

( * ) Notice: Subject to any disclaimer, the term of this patent is extended or adjusted under 35 U.S.C. 154(b) by 292 days.

(21) Appl. No.: 18/567,854

(22) PCT Filed: Jun. 10, 2022

(86) PCT No.: PCT/IB2022/055400
§ 371 (c)(1),
(2) Date: Dec. 7, 2023

(87) PCT Pub. No.: WO2022/259212
PCT Pub. Date: Dec. 15, 2022

(65) Prior Publication Data
US 2024/0264014 A1 Aug. 8, 2024

(30) Foreign Application Priority Data

Jun. 10, 2021 (DE) .......................... 202021103142.5

(51) Int. Cl.
G01G 19/12 (2006.01)
G01G 19/08 (2006.01)
(Continued)

(52) U.S. Cl.
CPC .......... G01L 1/2206 (2013.01); G01G 19/086 (2013.01); G01G 19/12 (2013.01);
(Continued)

(58) Field of Classification Search
CPC ........... G01L 1/2206; G01L 1/26; G01L 5/20; G01G 19/086; G01G 19/12; G01G 19/02;
(Continued)

(56) References Cited

U.S. PATENT DOCUMENTS

2020/0400515 A1 12/2020 Endo et al.
2022/0283016 A1 9/2022 Bunner et al.

FOREIGN PATENT DOCUMENTS

DE 4311903 A1 * 10/1994 ............. G01L 5/161
DE 10001272 A1 * 7/2001 ............. G01L 1/165
(Continued)

OTHER PUBLICATIONS

International Search Report and Written Opinion, Application No. PCT/IB2022/055400, dated Nov. 18, 2022.

*Primary Examiner* — Robert R Raevis
(74) *Attorney, Agent, or Firm* — MacMillan, Sobanski & Todd, LLC

(57) ABSTRACT

A vehicle wheel, and a monitoring device therewith, with a rim section and a disc section and a measuring device having at least one measuring sensor for detecting forces acting on the vehicle wheel. In order to provide a measuring device in a simplified manner, enabling to determine the dynamic load on the vehicle wheel during drive operation and static load forces, a metal strip is attached by means of an adhesive connection to the outer side of the rim section and the measuring device is assigned to the metal strip, wherein the measuring device has a bending strut provided with the at least one measuring sensor and being connected to the metal strip at two fastening zones spaced apart from one another, or the measuring sensor is connected to the metal strip and has several of differently oriented strain gauges for the local detection of a deformation of the metal strip between the fastening zones.

18 Claims, 4 Drawing Sheets

(51) Int. Cl.
    *G01L 1/22*         (2006.01)
    *G01M 17/013*     (2006.01)
    *B60C 19/00*       (2006.01)

(52) U.S. Cl.
    CPC ..... *G01M 17/013* (2013.01); *B60C 2019/004*
                 (2013.01); *B60C 2019/008* (2013.01)

(58) Field of Classification Search
    CPC . G01G 19/022; G01G 19/024; G01M 17/013;
                      B60C 2019/004; B60C 2019/008
    USPC ...... 73/862.042, 862.045, 862.381, 862.392,
                73/862.49, 862.541, 862.581, 862.621,
              73/862.625, 862.627, 862.632, 862.633,
                     73/146, 865.8; 177/132, 135
    See application file for complete search history.

(56)             References Cited

FOREIGN PATENT DOCUMENTS

| DE | 202019104976 U1 * | 12/2020 | ......... B60C 23/0498 |
| JP | 2004331038 A * | 11/2004 | |
| WO | 2017048762 A1 | 3/2017 | |

* cited by examiner

VEHICLE WHEEL WITH A MEASURING DEVICE AND A MONITORING DEVICE FOR VEHICLES

CROSS-REFERENCE TO RELATED APPLICATIONS

This application is a national stage of International Application No. PCT/IB2022/055400, filed 10 Jun. 2022, the disclosures of which are incorporated herein by reference in entirety, and which claimed priority to German Patent Application No. 20 2021 103 142.5, filed 10 Jun. 2021, the disclosures of which are incorporated herein by reference in entirety.

BACKGROUND TO THE INVENTION

The invention relates to a vehicle wheel with a rim section having rim flanges, rim shoulders and a rim well base for supporting a tyre and with a disc section having a hub connection flange with bolt holes and a transition section with ventilation holes and connected to the rim section for non-rotatably fastening the vehicle wheel to a vehicle, with a measuring device fastened co-rotatably to the vehicle wheel, having at least one measuring sensor for detecting forces acting on the vehicle wheel, and having a transceiver coupled to the measuring sensor for transmitting the load data detected with the measuring sensor to components, as in particular a vehicle-side monitoring device with an evaluation device, outside the vehicle wheel. The invention further relates to a monitoring device for vehicles with several vehicle wheels, wherein at least one vehicle wheel has a measuring device with a measuring sensor and a transceiver coupled to the measuring sensor, and with a vehicle-side evaluation device for the measuring signals of the measuring sensors.

In particular, heavy goods vehicles and normal goods vehicles are subject to weight restrictions on certain roads. In order to determine the load capacities in the vehicle, weight sensors can be permanently installed between the chassis of the vehicle and the loading area of the vehicle. These respective load sensors are intended for the exclusive detection of the weight on the load area of the goods vehicle. These sensors do not provide any other data for other vehicle states and are neither designed or provided to detect other conditions such as mass distribution, temperature, tyre pressure, wheel camber, etc. Such load states and other detected operating states can influence how a vehicle system reacts during the drive mode.

From WO 2017/048762 A1, it is known to fasten a monitoring device with a load detection device on the outer circumference of a rim section of a vehicle wheel in such a manner that the sensor is arranged protected from environmental influences in the pressure-loaded interior of the tyre. The load detection device has strain gauges, which are intended to determine the impact loads acting on the vehicle wheel both under static and dynamic conditions, for which the forces generated during the rotation of the vehicle wheel are determined as sinusoidal signals and the wheel load is determined by means of the recorded maxima. The static loads can also be detected, for which the rotational position of the monitoring device relative to the wheel contact area is also detected, if necessary, in order to determine the loads by correlating the measuring signals of the strain gauges with measuring data previously recorded under different loads. In the known solution, the housing of the monitoring device is fastened to the rim well base, preferably by adhesion, and has a lower part which is curved in accordance with the curvature of the well base. Additional sensors can be arranged in the housing in order to detect various vehicle states such as wheel-clamping force, wheel load, axle load, mass distribution, ambient temperature, wheel temperature and tyre air pressure. The information obtained through the sensors can be used by various systems such as in particular, but not exclusively, traction control system (TCS), anti-lock brake system (ABS), electronic brake force distribution (EBD), anti-roll stabilizer (AAR), Anti-Collision Braking System (CMBS), collision-avoidance brake system (CMB), all-wheel drive (AWD), tyre pressure control system (TPMS, TPMS), tyre wear and damage control logging. In order to supply the monitoring device permanently with energy, piezoelectric elements and an energy generation circuit are provided in the housing in order to convert the energy generated due to vibrations of the piezo elements into electrical energy, which is stored if necessary.

From WO 2021/048761 A1, a modified variant of a monitoring device for vehicle wheels is known, in which the housing has two fastening zones spaced apart from one another in the circumferential direction and a bending strut is arranged between the fastening zones as an essential element of the monitoring device, wherein the measuring sensors, in particular strain gauges, are arranged directly on the bending strut in order to determine the load forces acting on the respective vehicle wheel via the deformations of the bending struts. For anchoring the housing, either an adaptor plate with screw holes can be adhered to the outer circumference of the vehicle wheel, or anchoring pins or anchoring threads are fastened to the outer circumference of the vehicle wheel, with which the fastening zones interact. By means of this design, the actual measuring sensor can be replaced comparatively easily, and a corresponding housing can be attached to vehicle wheels with different wheel geometries.

From US 2021/0023893 is also known a measuring device and a vehicle wheel, with which the dynamic loads on a vehicle wheel are to be determined. However, the sensor is not arranged on the actual rim here, but on the disc part of the vehicle wheel, and namely either on spokes on the disc part or on an annular section of the disc part, for example containing the ventilation holes. The actual sensor shall preferably consist of a capacitive sensor with two sensor surfaces separated from one another by a dielectric material, and the sensor is arranged on a sensor seat on the surface of the disc part. If the vehicle wheel deforms due to different loads, the two sensor surfaces also deform, whereby an electrical signal is generated which is to be used to determine the wheel load. The magnitude of the signal depends on the angular position of the sensor relative to the wheel contact area and is greatest when the sensor is in the position above the wheel contact area. The document refers to empirical data, according to which there is a linear relationship between the tyre pressure and the actual measuring signal.

SUMMARY OF THE INVENTION

It is a feature of the invention to create a vehicle wheel which can be provided with a measuring device in an even more simplified manner in order to be able to determine the dynamic load on the vehicle wheel during drive operation and static load forces by means of a suitable measuring device.

To solve this problem, it is suggested according to a first solution concept with the invention that a metal strip is attached to a radial outer side of the rim section and the at least one measuring sensor is assigned to the metal strip, the metal strip has an underside and a top side and has at least one partial section with constant thickness between the underside and the top side in the circumferential direction, the underside of the metal strip is connected to the outer side of the rim section along the partial section by means of an adhesive connection, the measuring device has a bending strut provided with the at least one measuring sensor, which strut is connected to the metal strip at two fastening zones spaced apart from one another in the circumferential direction of the rim section for the local detection of a deformation of the metal strip between the fastening zones, and the metal strip has a length in the circumferential direction of the vehicle wheel that is greater than the distance between the fastening zones from one another.

The invention suggests a metal strip which is fastened to the circumference of the vehicle wheel as an additional element and which in turn has fastening elements in order to fasten the measuring device comprising the measuring sensor, preferably detachably, to the fastening elements of the metal strip. By inserting a metal strip, there is a high degree of flexibility with regard to the adaptation to different wheel geometries. The sensors do not measure directly on the surface of the rim section, but only indirectly via the deformation of the metal strip. A secure connection between the metal strip and the surface of the actual vehicle wheel can for example preferably be achieved via a suitable adhesive connection.

In the above-mentioned first solution concept, it is particularly advantageous if the fastening zones consist of two anchor pins or anchor nuts which are fastened circumferentially offset to one another on the cover side of the metal strip. These can preferably be welded or soldered to the metal strip.

The metal strip can preferably be partially provided with recesses between the fastening zones, wherein it is particularly advantageous if the recesses are attached symmetrically with respect to the fastening zones, whereby measuring deviations due to the recesses can be avoided.

According to one solution variant, the metal strip can only partially extend over the circumference of the rim section. However, it can prove to be advantageous if, according to an alternative solution variant, the metal strip extends completely over the circumference of the rim section. Particularly with the second solution variant, it is particularly advantageous if the metal strip has at least 2 partial sections with different strip widths transversely to the circumferential direction.

With all above variants of the first solution concept, it is particularly advantageous if the measuring device is provided with a housing and with an electrical circuit arranged in the housing together with the transceiver, the bending strut and the measuring sensor, wherein the measuring device is preferably fastened to the fastening zones as a unit in a detachable and replaceable manner.

According to a further variant of the first solution, the metal strip of one measuring device may comprise several sections, with a preferably thin metal band strip building an circumferential outer section and a thicker metal plate strip building a circumferential inner section, wherein the bending strut being composed of a center metal band strip fixed between inner ends of the metal plate strips facing each other, and preferably, the measuring sensor being fixed to an underside of the center metal band strip. Preferably on this variant, the outer metal band strips are fastened by the adhesive connection to the outer side of the rim section. Furthermore, preferably, the outer sections of each metal strip are fastened along their full circumferential extension and the inner sections are fastened along a part circumferential extension to the outer side of the rim section, with preferably, the metal plate strips building the circumferential inner sections comprise a plate thickness reducing step on the underside distancing the underside from the outer side of the rim section.

With this arrangement the glue of the adhesive connection transfers the displacement of the glued fixing points at the thin metal band strips to the thicker metal plate strips, which again transfers the displacement to the center metal band strip forming the bending strut and being equipped with the measuring sensor, generating the deformation signals for the bending strut. The strain gauges forming the measuring sensor are preferably installed only to the bottom surface of the bending strut, where both strain forces (bending and axial), are added up. It is particularly advantageous, if the measuring sensor is designed as a measuring surface with 4 strain gauges, of which two strain gauges are oriented in the circumferential direction and two further strain gauges are oriented transversely to the circumferential direction preferably parallel to the wheel axis.

According to a most preferred variant using the afore mentioned measuring device, two measuring devices each having a measuring sensor on its bending strut are positioned circumferentially offset from one another, wherein the distance of the two measuring sensors to each other in the circumferential direction is preferably 40°. With this embodiment, it is expedient if the measuring sensor is connected by means of a cable connection to an electronic circuit, the transceiver and a power supply source, which preferably form components or additional parts of an air pressure measuring device (TPMS) assigned to the vehicle valve.

To solve the problem mentioned above, it is proposed according to a second, alternative solution concept with the invention that a metal strip is attached to a radial outer side of the rim section and the at least one measuring sensor is assigned to the metal strip, the metal strip has an underside and a top side and has at least one partial section with constant thickness between the underside and the top side in the circumferential direction, the underside of the metal strip is connected to the outer side of the rim section along the partial section by means of an adhesive connection, the measuring device has at least one measuring sensor connected to the metal strip having several of differently oriented strain gauges for local detection of a deformation of the metal strip, and the metal strip has a length in the circumferential direction that is greater than a partial length covered by the strain gauges of the measuring sensor in the circumferential direction.

Here, too, according to the invention, a metal strip is used which is adhered to the surface of the rim section of the vehicle wheel. However, the measuring device cannot be replaced here, but the actual measuring sensors are arranged directly on the metal strip in order to locally detect the deformations of the metal strip. Nevertheless, the advantage remains that the metal strip fastened to the circumference of the vehicle wheel as an additional element offers a comparatively high degree of flexibility with regard to adaptation to different wheel geometries, whereby a prefabricated measuring device arranged on the metal strip can be adapted to different wheel geometries.

According to an advantageous embodiment, the measuring sensor with the strain gauges is covered by means of a plastic cover, in particular a plastic strip which is adhered to the top side of the metal strip).

It is particularly expedient if the measuring sensor is designed as a measuring surface with 4 strain gauges, of which two strain gauges are oriented in the circumferential direction and two further strain gauges are oriented transversely to the circumferential direction. It is also expedient if the measuring sensor is connected by means of a cable connection to an electronic circuit, the transceiver and a power supply source, which form components or additional parts of an air pressure measuring device (TPMS) assigned to the vehicle valve.

In all variants, it is particularly advantageous if, distributed over the circumference of the rim section, at least 2 measuring sensors working independently form each other are positioned circumferentially offset from one another, wherein the distance of the two measuring sensors to each other in the circumferential direction is preferably at least 20°, and in particular 22.5° within several variants or 40° within a different embodiment. A corresponding arrangement enables the static load to be measured on all vehicle wheels mounted on the vehicle when the vehicle is stationary, irrespective of the angle of rotation position of the vehicle wheel. The latter is based on the finding that at certain angles of rotation, if only one measuring sensor is present per vehicle wheel, it is not possible to mathematically determine the static load from the measured values. The load measured by a sensor depends on the angular position (angle of rotation) $\alpha$ of the position of the sensor relative to the wheel contact area. The basic mathematical approach is that the sensor value e determined with the sensor, assuming a constant weight load L, a constant internal tyre pressure p and a constant ambient temperature T during a rotation of 360°, results in a periodic function that depends on the angle of rotation a during a complete wheel rotation. Basically, as a mathematical approach, the formula $$e = f(\alpha, L, T, P)$$

can be set up. If it is assumed that there is a linear relationship between the tyre pressure and the temperature and the sensor values set at a sensor, then this function can mathematically be split into several components, namely $$e = e_0(T, P) + g(P) * L * c(\alpha)$$

With this mathematical assumption,
$e_0$ forms the part of the function that is not dependent on the weight load,
$c(\alpha)$ forms the part that is proportionally dependent on the weight load as a periodic function. $c(\alpha)$ corresponds to a periodic function that ideally repeats itself with every rotation of the wheel, which is why the following applies:

$$c(\alpha) = c(\alpha + 2k\pi).$$

g(P) is the scaling factor that reflects the pressure-dependent influence due to the stiffness of the wheel-tyre system.

These formulas and conditions are helpful when the static load due to the weight force shall be determined. The prerequisite for this is, among others things, a determination of the proportion factor $e_0$. This takes place with a suitable calibration method in order to determine the displacement coefficient of the respective curve depending on the temperature and tyre pressure. In a further calibration method, $c(\alpha)$ is then determined by a plurality of measurements, for which corresponding measurements are carried out at different angular positions of the sensor.

After the individual factors are determined in the calibration method in a suitable manner, the dynamic weight load can be mathematically determined with the formula $$L = e_{amp}/k(P)$$

whereby the following applies to the dynamic measurement:

$$e_{amp} = e_{max} - e_{min}$$

$$k(P) = g(P) * (c(\alpha)_{max} - c(\alpha)_{min})$$

For determining the dynamic load, it is therefore not necessary to know the angle of rotation and the temperature if a vehicle wheel calibration reference curve is available via the calibration for the respective internal tyre pressure.

The static weight load on each vehicle wheel can be determined with the following formula:

$$L = \frac{e - e_0(T, P)}{g(P) * c(\alpha)}$$

where e is the measured value resulting at a certain angle. As $c(\alpha)=0$ applies to very specific positions of the angle of rotation, the presence of only one sensor results in singularities/definition gaps for these rotational angle positions, which cannot be resolved mathematically. Even though the user could be informed by the evaluation device that the vehicle has to be moved into a different position, but, as it cannot be excluded with several vehicle wheels that at least one of the vehicle wheels is in a corresponding position at certain wheel positions, it is provided according to the particularly preferred design that two sensors are assigned to each vehicle wheel. According to the particularly preferred design, the at least 2 measuring sensors are assigned to the same metal strip; preferably the metal strip then extends in the circumferential direction beyond the position of the measuring sensors, and in particular preferably by a strip section of more than 20 mm beyond the outermost area of the measuring sensors. Alternatively or additionally, the metal strip should also extend transversely to the circumferential direction beyond the area covered by the measuring sensors, in particular so that the influence of the edge of the metal strip is largely eliminated.

In all of designs, the metal strip can consist of stainless steel, light metal, a metal alloy or high-grade steel. The metal strip should have a thickness of between 0.03 mm and 0.25 mm, in particular a constant thickness of between 0.05 mm and 0.2 mm, in particular in the partial section in which the measuring sensors are also arranged. The metal strip should furthermore have a width of more than 15 mm in the partial section.

The connection between the metal strip and the surface of the rim section preferably takes place via an adhesive connection by means of an adhesive which has a modulus of elasticity of at least 50 MPa, preferably more than 200 MPa, particularly preferably more than 450 Mpa, the thickness of the adhesive in the area of the adhesive connection is preferably less than 0.25 mm, and most preferably less than 0.125 mm.

The adhesive is preferably selected from an adhesive based on acrylic, cyanoacrylate or silicone. The adhesive can in particular be applied to both sides on the underside of the metal strip and on the outer side of the rim section. The thickness of the adhesive can be approximately equal to or greater than the thickness of the metal strip in the partial section.

The invention also relates to a monitoring device for vehicles with multiple vehicle wheels, wherein at least one vehicle wheel is designed according to one of the inventive solution approaches and is correspondingly provided with a metal strip, to which a measuring device with a measuring sensor and a transceiver coupled to the measuring sensor is assigned, wherein a vehicle-side evaluation device for the measuring signals of the measuring sensors is available. According to the invention, the monitoring device is designed and formed to be able to determine from the measuring signals of the measuring sensors the dynamic load in drive operation and the static load in the stationary state of a vehicle on the associated vehicle wheel, wherein, for determining the dynamic load by means of the evaluation device, the measuring signal amplitude between the measured maximum signal value and the measured minimum signal value at one wheel rotation is determined and compared with the amplitude values from a vehicle wheel calibration reference curve for determining a deviation factor, and/wherein, for determining the static load, the angle of rotation between the sensor position and the wheel contact position is determined and, by means of the evaluation device, the measured signal value is compared with a reference value from a vehicle wheel calibration reference curve for the same angle of rotation, wherein several vehicle wheel calibration reference curves for different temperatures and internal tyre pressures are stored in the evaluation device. It is particularly advantageous that the measured values determined continuously during the dynamic measurement for the respective vehicle and the weight load can be used to determine the load-independent factor $e_0$, via which, in turn, the displacement of the curve at different temperatures and tyre pressures is determined based on the previous calibration, which is required for the static load calculation. With a suitable prior calibration, the static load can be determined from the signal values independent of pressure and temperature via the load-independent factor $e_0$.

Other advantages of this invention will become apparent to those skilled in the art from the following detailed description of the preferred embodiments, when read in light of the accompanying drawings.

DETAILED DESCRIPTION OF THE INVENTION

Figures 1, 2, 3, 4:
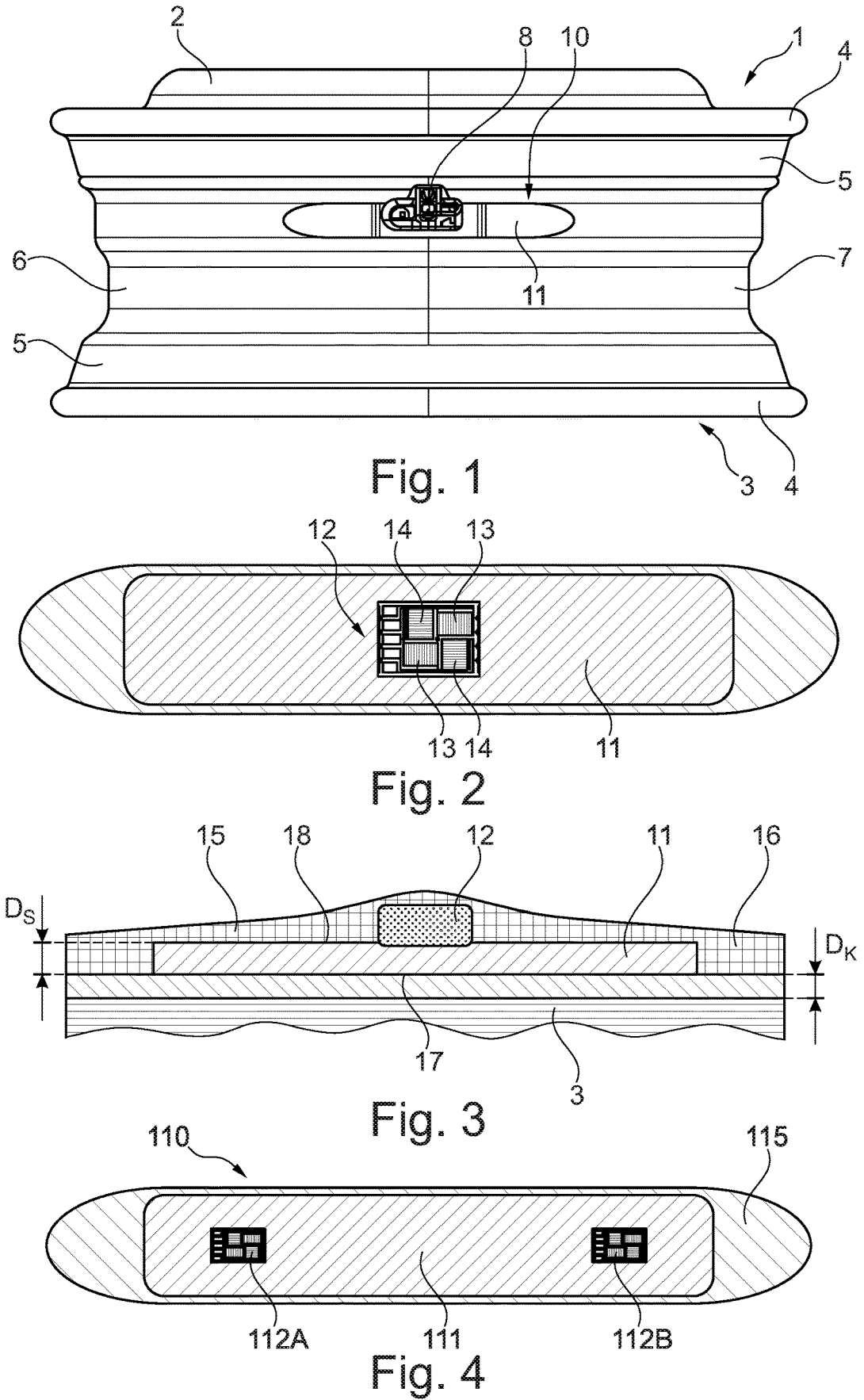
FIG. 1 schematically shows a highly simplified and not true-to-scale vehicle wheel in top view with a mounted measuring device according to a first exemplary embodiment and a schematically indicated tyre pressure valve for a tyre pressure control system (TPMS)
FIG. 2 shows the measuring device according to the first exemplary embodiment in a schematic top view.
FIG. 3 shows the measuring device according to FIG. 1 in a schematic detailed sectional view through the rim section and the measuring device.
FIG. 4 shows a measuring device similar to FIG. 1 and FIG. 2 according to a second exemplary embodiment.

In FIG. 1, a vehicle wheel is denoted overall by reference numeral 1, which has a disc section 2 and a rim section 3 in a manner known per se. The vehicle wheel can consist in one piece, for example, of a cast part made of light metal, or the disc section 2 and the rim section 3 are manufactured separately and then connected to one another to form an assembled vehicle wheel, preferably by a welded joint. The disc section 2 serves functionally for the non-rotatable fastening of the vehicle wheel 1 to the hub of a vehicle (not shown); the rim section 3 is functionally used to support a tyre (not shown) made of plastic and inflated to an internal pressure recommended by the vehicle manufacturer, wherein only the tyre is in contact with the ground. For supporting and mounting the tyre, the rim section 3 has, in a manner known per se, two rim flanges 4, two rim shoulders 5 and a multi-stage rim well base 6. The rim shoulders serve for the radial support of the tyre, the rim flanges for the axial support of the tyre. The disc section 3, which is only partially shown here, is provided with bolt holes for mounting the vehicle wheel 1 to the hub on a hub connection surface and further provided with ventilation holes (not shown) for cooling brakes in a transition section. Vehicle wheels can have different geometries and designs, which is why the vehicle wheel shown is only symbolic in nature, without restricting the invention to this.

In the exemplary embodiment according to FIG. 1, a tyre pressure valve 8 of a tyre pressure monitoring system (RDKS), not shown further, is also indicated schematically. The tyre pressure valve 8 is provided with at least one internal pressure sensor, an energy source for supplying energy and a transceiver for transmitting the measuring signals from the internal pressure sensor to a tyre pressure control device on the vehicle, in order to display the current internal tyre pressure for each tyre to the vehicle driver, as is now prescribed for new vehicles. A vehicle wheel with an arbitrary structure and equipped with a tyre pressure valve for a tyre pressure control system is known to a person skilled in the art, which is why no further description is given here.

A measuring device 10 additionally arranged on the radial outer side of the rim section 3 of the vehicle wheel is essential to the invention. In FIG. 1, the measuring device 10 is arranged on a transitional section of the rim well base 6 between the well base bottom 7 and one of the rim shoulders 5. The measuring device 10 consists of a metal strip 11 which is adhered to the outer circumference of the rim section 3 by means of an adhesive connection. The metal strip 11 in turn, as can be seen clearly in FIG. 2 and FIG. 3, is provided here with a measuring sensor 12 in the centre of its longitudinal and transverse extent, which, as the schematic illustration in FIG. 2 shows approximately, is equipped here with a total of four strain gauges 13, 14. The two strain gauges 13 are oriented in the circumferential direction, that is, in the direction of rotation of a vehicle wheel rotating about a wheel axle, the two strain gauges 14 are oriented transversely to the circumferential direction. The individual strain gauges 13, 14 are connected in the manner of a Wheatstone measuring bridge in order to provide deformations of the metal strip as a sensor measuring signal. The measuring sensor 12 measures the deformations of the metal strip 11, wherein the deformations of the metal strip 11 correspond to the deformations of the vehicle wheel 1 in the area of the rim section 3. The degree and direction of the deformations depend on the weight of the vehicle with the respective load and, in the case of a moving vehicle, also on the dynamic loads. In addition, there is the influence of the mounted tyre as well as the influence of the internal pressure of the tyre and the temperature.

As can be clearly seen in FIGS. 1 to 3, the metal strip 11 has a significantly greater length and also a somewhat greater width than the dimensions of the measuring sensor 11. The entire metal strip including the measuring sensor 12 is covered by a plastic cover 15 on the circumference of the measuring device 12. The entire underside 17 of the metal strip 11 and the underside 19 of the plastic cover projecting beyond it are fixed to the surface of the rim part 3 by means of an adhesive layer 16 indicated schematically in FIG. 3. In the exemplary embodiment shown, the thickness DK of the adhesive layer 16 is slightly less than the thickness Ds of the metal strip 11. This is only for illustration; in the description instruction and the claims, different thickness ratios are addressed, as well as different materials and material properties for the metal strip and the adhesive for the adhesive connection. In the mounted state, the measuring sensor 12 fastened to the top side 18 of the metal strip 11 is completely protected between the plastic cover 15 and the metal strip 11. Due to the position of the measuring device 10 within the tyre on the outer side of the rim section 3, this measuring device 10 is also largely protected against external influences. By means of the arrangement of the measuring device near the tyre pressure valve 8 of the tyre pressure control device, the energy source and the transceiver of the tyre pressure valve can be used to supply energy to the measuring sensor 12 of the measuring device 10 and also to wirelessly transmit the measuring signals of the measuring sensor 12 to a vehicle-side evaluation device of a vehicle-side monitoring device (not shown). In FIGS. 2 and 3, the metal strip 11 has a constant thickness Ds between the top side 18 and the underside 17 along its entire length in the circumferential direction. However, it can be sufficient if the constant thickness only exists in the area in which the measuring sensor or measuring sensors are arranged.

FIG. 4 shows a minor modification of the measuring device according to FIG. 2. The main difference is that the measuring device 110 according to FIG. 4 is provided with two measuring sensors 112A, 112B, which are arranged offset from one another in the circumferential direction on the metal strip 111 of the measuring device 110. Here, too, the entire metal strip 11 together with the two measuring sensors 112A, 112B is covered all around by a plastic cover 115, and the fastening to the vehicle wheel is carried out by means of an adhesive connection respectively on the underside of the plastic cover 115 and the underside of the metal strip 111, as in the previous exemplary embodiment. As the measuring device 110 is provided with two measuring sensors 112A, 112B that are arranged circumferentially offset relative to one another, the distance between the two measuring sensors 112A, 112B can be selected in such a way that, in the mounted state, the angular distance between the two measuring sensors 112A, 112B is at least 20° in the circumferential direction, preferably even at least 22.5. The total length of the metal strip 111 within the measuring device 110 must have a correspondingly sufficient length.

Figures 5, 6, 7:
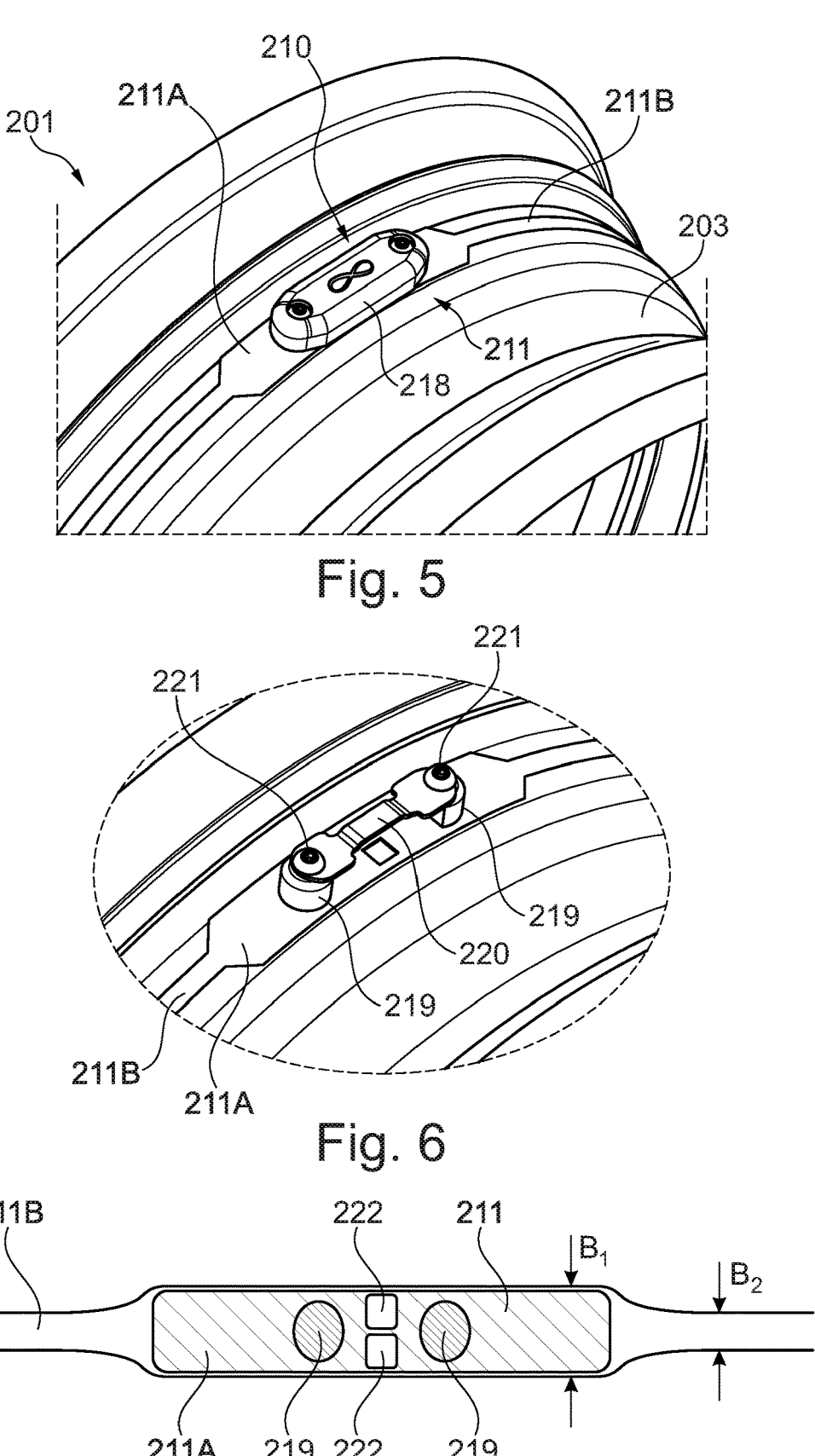
FIG. 5 shows a measuring device according to a second exemplary embodiment in the mounted state on a rim section in perspective view.
FIG. 6 shows the measuring device of FIG. 5 with the housing removed.
FIG. 7 shows the measuring device of FIG. 6 schematically simplified in top view.

FIGS. 5 to 7 show yet another alternative embodiment. Similar to the previous exemplary embodiment, the measurement is carried out indirectly via a metal strip 211 which is fastened to the outer side of a rim section 203 of a vehicle wheel by means of an adhesive connection, not shown, and in this respect fully experiences and passes on the deformations of the rim section. A measuring device 210 provided with a housing 218 is fastened to the metal strip 211, and namely, as can be clearly seen in FIG. 6, to two anchor nuts 219 spaced apart from one another in the circumferential direction. The measuring device 210 has a bending strut 220 here, the two ends of which are each fixed circumferentially offset from one another on the anchor nuts 219 by means of detachable fastening screws 221. The strain gauges (not shown) are in turn fastened to the bending strut 220. A power supply and a transceiver can also be arranged within the housing 218 so that the measuring sensor 210 can be replaced by another measuring sensor if necessary. The anchor nuts can be made of the same material as the metal strip 211 and can be welded or soldered to it, but they can also be made in other ways, e.g. can be fastened to the metal strip 211 by means of an adhesive connection. Between the two anchor nuts 219, the metal strip 211 can be provided with one or, as here, several recesses 222, wherein the recesses 222 are preferably positioned symmetrically to and between the two anchor nuts 219.

Here, too, the metal strip 211 extends beyond the anchor nuts 219 in the circumferential direction. The anchor nuts 219 are arranged in an area of the metal strip 211 which has a first larger width B; transversely to the circumferential direction. The partial section 211A of the metal strip 211, in which the anchor nuts 219 and the recesses 222 are arranged, is followed by a narrow-banded partial section 211B, the width $B_2$ of which is preferably equal to 50% or less than 50% of the width $B_1$ in the partial section 211A. The partial section 211B can extend over the remaining circumference of the rim part 203 (FIG. 5), so that the metal strip 211 is therefore arranged all the way round.

Figure 8:
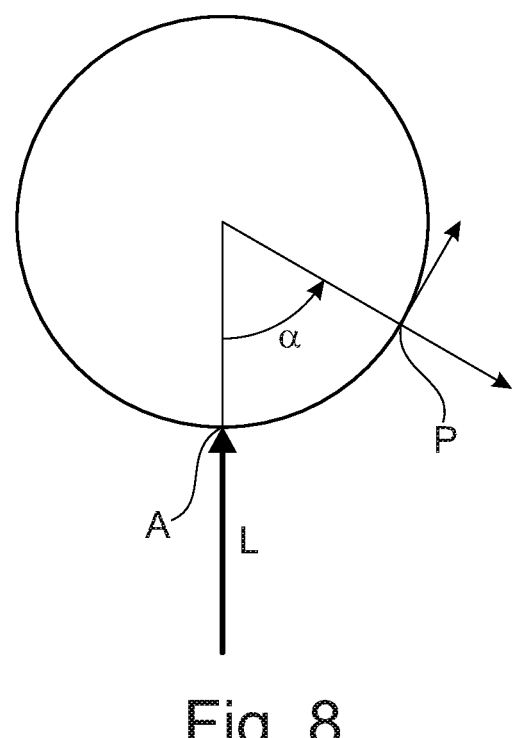
FIG. 8 shows schematically highly simplified the relationship between the angle of rotation and the wheel contact area by means of a diagram.
Figure 9:
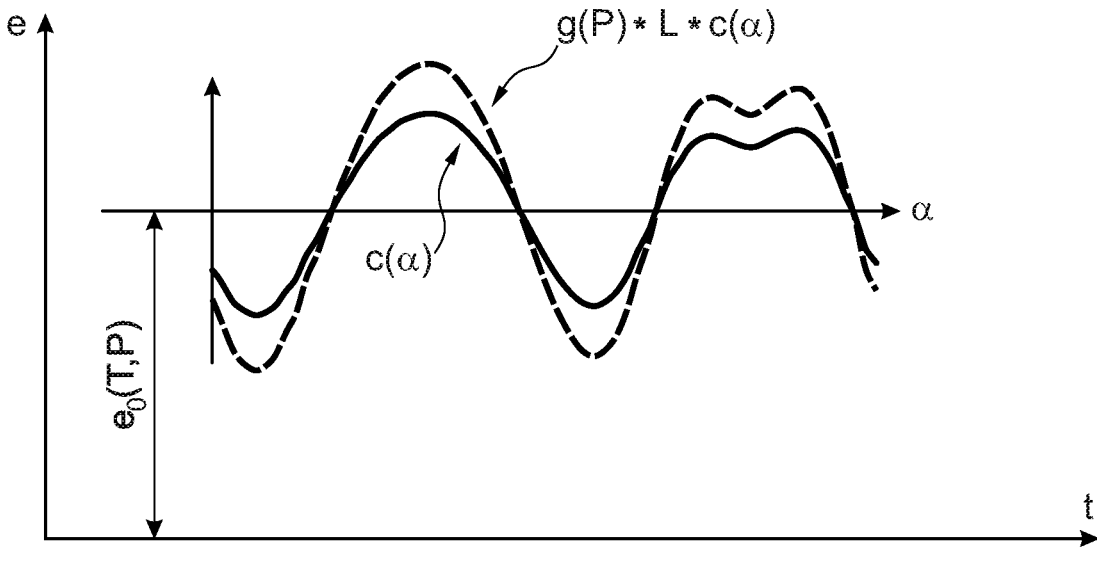
FIG. 9 shows a highly simplified example of a diagram showing the periodic measuring signal values for several measured wheel rotations, split into different parts.

FIG. 8 serves as a diagram for the clarification of the angle of rotation a between the position of the wheel contact area A, at which the entire wheel load L is supported on the ground, and the actual current position P of the sensor device of a measuring sensor of a measuring device rotating with a vehicle wheel. At each position or at each angle of rotation a of the position P of a measuring sensor relative to the contact area A, a deformation of the rim section can be measured with the strain gauges and returned as a measuring signal to an evaluation device. Hereby, the measuring signal takes a periodic course depending on the angle $\alpha$ (or over time t in the case of a moving vehicle), as indicated in FIG. 9. FIG. 9 clarifies again the dependencies between the load-dependent part $g(P)*L*c(\alpha)$ and the non-load-dependent factor $e_0$ explained above, via which the displacement of the curve at different temperatures and tyre pressures can be determined after prior calibration. Reference is also made to the formulas set out in the introduction of the description.

FIGS. 10 to 13 show a further different $3^{rd}$ embodiment. The vehicle wheel is denoted overall by reference numeral 301 and the wheel has a disc section 302 and a rim section 303 in a manner known per se. The rim section 303 again has, in a manner known per se, two rim flanges 304, two rim shoulders 305 and a multi-stage rim well base 306. The disc section 302, which is only partially shown here, is provided with bolt holes 340 and ventilation holes 341, which ventilation holes may have different positions and configurations, as known per se to the person skilled in the art. Again, a measuring device arrangement 350 comprising two measuring devices 310 of same construction is additionally arranged on the radial outer side of the rim section 303 of the vehicle wheel. The measuring device arrangement 350 with the two independent measuring devices 310 is arranged on a transitional section of the rim well base 306 between the well base bottom 307 and one of the rim shoulders 305. The measuring device arrangement 350 consists of two measuring devices 310 both having same configuration and construction and being schematically shown in detail in FIGS. 11 and 12. Each of the measuring devices 310 is arranged symmetrically to the valve hole 308, which is equipped with a valve as well as a tire pressure monitoring system (RDKS), being referenced with 360. The tire pressure monitoring system 360 comprises several elements including housing as well as a battery and an electronic circuit (not shown) within the housing, which will be used here also for sensing, monitoring and transmitting the sensor signals of each of the measuring devices 310 to a monitoring device of the vehicle, on which the wheel is installed.

Figures 10, 11, 12, 13:
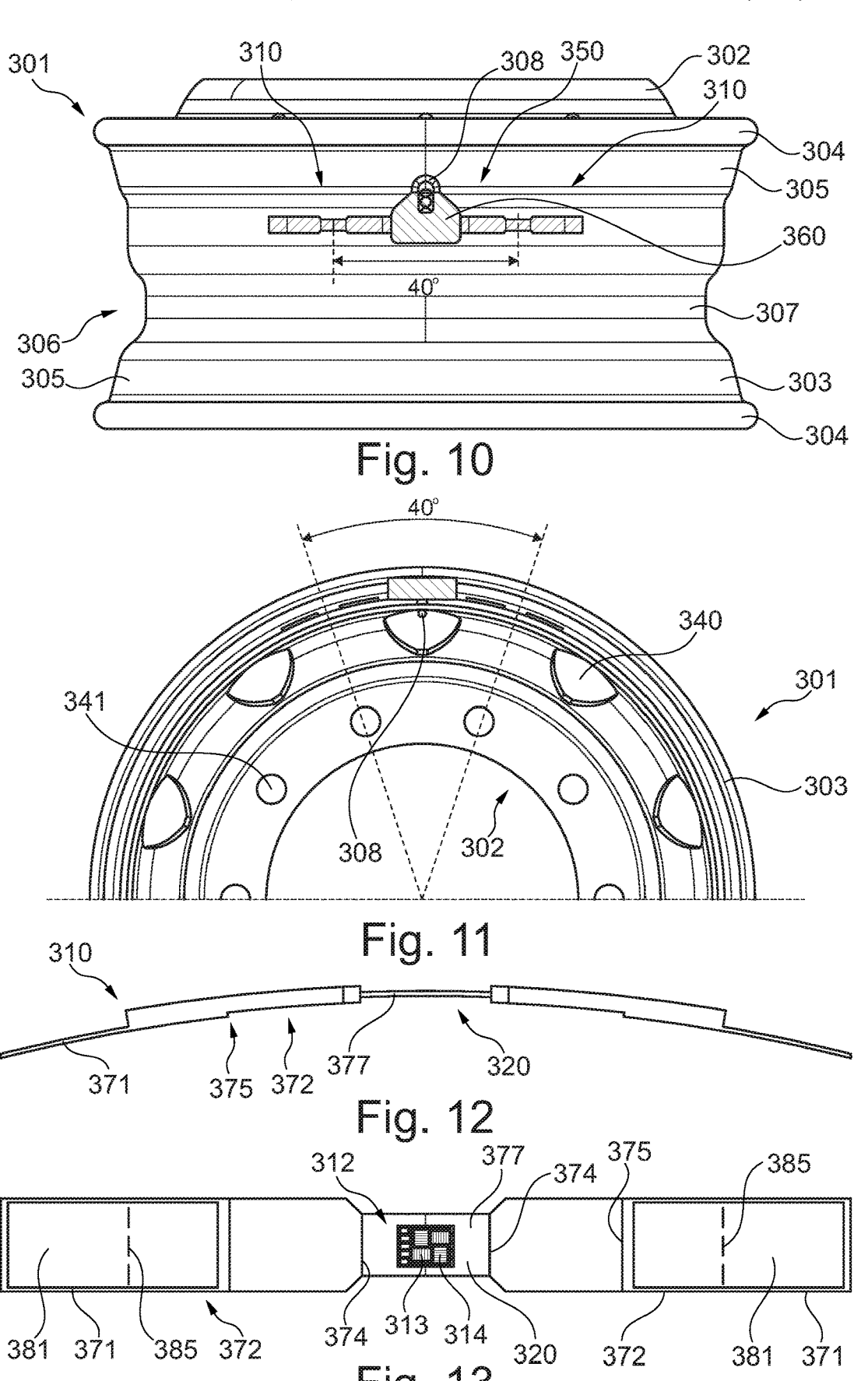
FIG. 10 schematically shows, similar to FIG. 1, a measuring device arrangement according to a further alternative third embodiment and a schematically indicated tyre pressure valve for a tyre pressure control system (TPMS)
FIG. 11 shows the measuring device arrangement according to FIG. 10 in side sectional view of the vehicle wheel.
FIG. 12 schematically shows one of the measuring devices according to the third embodiment in enlarged scale side view.
FIG. 13 schematically shows the measuring device in view onto the bottom side.

The construction principle of each of the measuring devices 310 can best be seen from FIGS. 12 and 13. Each of the measuring devices 310 comprises on both circumferential opposed ends an outer first section being built by a metal band strip 371 as well as a second section built by a metal plate strip 372; the metal band strip 371 and the metal plate strip 372 are fixed to each other preferably by welding or soldering. The underside of the metal band strip 371 is fixed to the outer side of the rim by a glue layer referenced with 381 in FIG. 13. The same glue layer is also used to fix the circumferentially outer part of the metal plate strip 372 to the outer side of the rim. The metal plate strip 372 is thicker than the metal band strip 371 and is also having a longer extension in circumferential direction, while the width of metal plate strip 372 and metal band strip 371 is identical. In FIG. 13, the dotted line 385 presents the line where metal plate strip 372 starts and the metal band strip 371 ends. The metal plate strip 372 comprises on its bottom side a thickness reducing step 375, and the glue layer 381 extends over almost the entire extension length of the of metal band strip 371, but only until near to the reducing step 375 on the bottom side of the metal plate strip 372. Due to the thickness reducing step 375, a gap exists between the circumferential inner of the metal plate strip 372 and the outer side of the rim. Finally, a bending strut 320 is fixed between the inner ends of the metal plate strips 372 facing each other. The bending strut 320 is formed by a center metal band strip 377, again having thinner thickness and also smaller width compared to the metal plate strips 372.

A measuring sensor 312, preferably having a very similar configuration as the measuring sensor shown in FIG. 2 and described in connection with that embodiment, and thus having a total of four strain gauges, from which two strain gauges 313 are oriented in the circumferential direction, that is, in the direction of rotation of the vehicle wheel rotating about a wheel axle, and the two strain gauges 314 being oriented transversely to the circumferential direction. The individual strain gauges 313, 314 are connected in the manner of a Wheatstone measuring bridge in order to provide deformations of the metal band strip 377 forming and being used as the bending strut 320. The measuring sensor 312 measures the deformations of the center metal band strip 377 or bending strut 320, respectively, between those sections of the metal band strip 371 and metal tape strip 372 being fixed to the rim by adhesive connection, and thus both circumferential deformation and transversal deformation will be detected. It is sufficient to arrange the measuring sensor 312 on the bottom side of the center metal band strip 377 in order to detect both deformations in axial direction and in circumferential direction.

In the preferred embodiment, as shown in FIGS. 10 and 11, two measuring devices 310 are installed symmetrically to the valve hole and the tire pressure monitoring system arranged on the valve inserted in the valve hole; the entire electronics of the tire pressure monitoring system including the battery can be used by connecting the measuring sensors 312 to the electronics, preferably by wiring. No additional connection between the individual measuring devices and the tire pressure monitoring system and its electronics is needed. The lengths and positions of each of the measuring devices is preferably adapted such that the two centers of each of the center metal band strip are arranged with an offset of 40°; the centers of each of the center metal band strips 377 corresponds to the center position of each of the measuring sensors 312. The fixing of the metal band strips of each of the measuring devices by gluing to the outer side of the rim can be done easily and the identical sensor can be used on any kind of wheels and wheel size. With the two measuring sensors in the measuring device arrangement 350, the risk of zero-crossing can easily be avoided. also, it is possible to measure the wheel load also in static condition, where the vehicle does not know.

The measuring devices needs not to be fixed to the wheel rim at the position of the valve hole but could also be used in different position depending on the most deforming zones; the higher the deformation, the better is the load estimation crazy of the measuring arrangement with the measuring devices. By adding an additional gyroscope sensor, an indirect vehicle speed measurement could also be achieved.

Numerous modifications will become apparent to the person skilled in the art from the foregoing description, which are intended to fall within the scope of the appended claims.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A vehicle wheel with a rim section having rim flanges, rim shoulders and a rim well base for supporting a tyre and with a disc section having a hub connection flange with bolt holes and a transition section with ventilation holes and connected to the rim section for non-rotatably fastening the vehicle wheel to a vehicle, with a measuring device fastened co-rotatably to the vehicle wheel, having at least one measuring sensor for detecting forces acting on the vehicle wheel, and having a transceiver coupled to the at least one measuring sensor for transmitting the load data detected with the at least one measuring sensor to components outside the vehicle wheel, wherein a metal strip is attached to a radial outer side of the rim section and the at least one measuring sensor is assigned to the metal strip, the metal strip has an underside and a top side and has at least one partial section with constant thickness between the underside and the top side in a circumferential direction, the underside of the metal strip is connected to the outer side of the rim section along the at least one partial section by means of an adhesive connection, the measuring device has a bending strut provided with the at least one measuring sensor, which strut is connected to the metal strip at two fastening zones spaced apart from one another in a circumferential direction of the rim section for a local detection of a deformation of the metal strip between the fastening zones, and the metal strip has a length in a circumferential direction of the vehicle wheel that is greater than a distance between the fastening zones from one another.

2. The vehicle wheel according to claim 1, wherein the fastening zones consist of two anchor pins or anchor nuts which are circumferentially offset relative to one another, fastened, to the top side of the metal strip.

3. The vehicle wheel according to claim 1, wherein the metal strip is partially provided with recesses between the fastening zones, wherein the recesses are attached symmetrically with respect to the fastening zones.

4. The vehicle wheel according to claim 1, wherein the metal strip extends only partially over the circumference of the rim section, or that the metal strip extends completely over the circumference of the rim section, wherein the metal strip has at least 2 partial sections with different strip widths transversely to the circumferential direction.

5. The vehicle wheel according to claim 1, wherein the measuring device is provided with a housing and with an electrical circuit arranged in the housing together with the transceiver, the bending strut and the measuring sensor, wherein the measuring device is fastened to the fastening zones as a unit in a detachable and replaceable manner.

6. The vehicle wheel according to claim 1, wherein the metal strip of the measuring device comprises several sections, with a thin metal band strip building an circumferential outer section and a thicker metal plate strip building an circumferential inner section, wherein the bending strut being composed of a center metal band strip fixed between inner ends of the metal plate strips facing each other, and, the measuring sensor being fixed to an underside of the center metal band strip.

7. The vehicle wheel according to claim 6, wherein the outer sections of the metal band strips are fastened by the adhesive connection to the outer side of the rim section, and wherein, the outer sections of each metal strip are fastened along their full circumferential extension and the inner sections are fastened along a part circumferential extension to the outer side of the rim section, with, the metal plate strips building the circumferential inner sections comprises a plate thickness reducing step on the underside distancing the underside from the outer side of the rim section.

8. The vehicle wheel according to claim 6, wherein two measuring devices each having a measuring sensor on its bending strut are positioned circumferentially offset from one another.

9. The vehicle wheel according to claim 1, wherein, distributed over the circumference of the rim section, at least 2 measuring sensors are positioned circumferentially offset from one another, wherein the distance of the two measuring sensors to each other in the circumferential direction is at least 20°.

10. The vehicle wheel according to claim 9, wherein the at least 2 measuring sensors are assigned to the same metal strip, wherein the metal strip extends in the circumferential direction beyond the position of the measuring sensors or wherein the metal strip extends transversely to the circumferential direction beyond the area covered by the measuring sensors.

11. The vehicle wheel according to claim 1, wherein the metal strip consists of the group of stainless steel, light metal, a metal alloy or high-grade steel, and/or that the metal strip has a thickness of between 0.03 mm and 0.25 mm in the partial section, and/or that the metal strip has a width of more than 15 mm in the partial section.

12. The vehicle wheel according to claim 1, wherein the adhesive connection takes place by means of an adhesive which has a modulus of elasticity of at least 50 MPa, and/or that the thickness of the adhesive in the area of the adhesive connection is less than 0.25 mm.

13. The vehicle wheel according to claim 12, wherein the adhesive is applied to both sides on the underside of the metal strip and on the outer side of the rim section, and/or that the thickness of the adhesive is approximately the same as or greater than the thickness of the metal strip in the partial section.

14. The vehicle wheel according to claim 1, wherein the adhesive is selected from an adhesive based on acrylic, cyanoacrylate or silicone.

15. A monitoring device for vehicles having at least one vehicle wheel according to claim 1 and a vehicle-side evaluation device for a measuring signal of the at least one measuring sensor of the at least one vehicle wheel, wherein the monitoring device is configured to be able to determine from the measuring signal of the at least one measuring sensor the dynamic load in drive operation and the static load in the stationary state of the vehicle on the at least one vehicle wheel, wherein, for determining the dynamic load by means of the evaluation device, the measuring signal amplitude between the measured maximum signal value and the measured minimum signal value at one wheel rotation is determined and compared with the amplitude values from a vehicle wheel calibration reference curve for determining a deviation factor, and/wherein, for determining the static load, the angle of rotation between the sensor position and the wheel contact position is determined and, by means of the evaluation device, the measured signal value is compared with a reference value from a vehicle wheel calibration reference curve for the same angle of rotation, wherein several vehicle wheel calibration reference curves for different temperatures and internal tyre pressures are stored in the evaluation device.

16. A vehicle wheel with a rim section having rim flanges, rim shoulders and a rim well base for supporting a tyre and with a disc section having a hub connection flange with bolt holes and a transition section with ventilation holes and connected to the rim section for non-rotatably fastening the vehicle wheel to a vehicle, with a measuring device fastened co-rotatably to the vehicle wheel, having at least one measuring sensor for detecting forces acting on the vehicle wheel, and having a transceiver coupled to the measuring sensor for transmitting the load data detected with the measuring sensor to components outside the vehicle wheel, wherein a metal strip is attached to a radial outer side of the rim section and the at least one measuring sensor is assigned to the metal strip, the metal strip has an underside and a top side and has at least one partial section with constant thickness between the underside and the top side in the circumferential direction,

the underside of the metal strip is connected to the outer side of the rim section along the partial section by means of an adhesive connection, the measuring device has at least one measuring sensor connected to the metal strip having several of differently oriented strain gauges for local detection of a deformation of the metal strip, and the metal strip has a length in the circumferential direction that is greater than a partial length covered by the strain gauges of the measuring sensor in the circumferential direction.

17. The vehicle wheel according to claim 16, wherein the measuring sensor with the strain gauges is covered by means of a plastic cover.

18. The vehicle wheel according to claim 16, wherein the measuring sensor is configured as a measuring surface with 4 strain gauges, of which two strain gauges are oriented in the circumferential direction and two further strain gauges are oriented transversely to the circumferential direction.

* * * * *